United States Patent
Branson et al.

(10) Patent No.: US 6,671,721 B1
(45) Date of Patent: Dec. 30, 2003

(54) OBJECT ORIENTED FRAMEWORK MECHANISM AND METHOD FOR DISTRIBUTING AND MANAGING HETEROGENOUS OPERATIONS OF A NETWORK APPLICATION

(75) Inventors: Michael John Branson, Rochester, MN (US); Steven Gene Halverson, Rochester, MN (US); Gregory S. Hurlebaus, Rochester, MN (US); Brian Richard Lucier, Rochester, MN (US); David Henry Sandifer, Rochester, MN (US); Andrew James Streit, Rochester, MN (US); Patrick Michael Wildt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/296,956
(22) Filed: Apr. 22, 1999
(51) Int. Cl.[7] .......................... G06F 15/173; G06F 9/46
(52) U.S. Cl. ........................ 709/224; 709/316
(58) Field of Search .................. 709/224, 223, 709/226, 316, 317, 315, 100, 102, 103; 712/2, 48

(56) References Cited

U.S. PATENT DOCUMENTS

| | | | | |
|---|---|---|---|---|
| 5,555,375 A | * | 9/1996 | Sudama et al. ............. 709/226 |
| 5,822,585 A | * | 10/1998 | Noble et al. ................ 709/316 |
| 6,012,149 A | * | 1/2000 | Stavran ........................ 714/2 |
| 6,032,208 A | * | 2/2000 | Nixon et al. .................. 710/64 |
| 6,106,569 A | * | 8/2000 | Bohrer et al. ............... 717/100 |
| 6,237,024 B1 | * | 5/2001 | Wollrath et al. ............ 709/203 |

* cited by examiner

Primary Examiner—Mark R. Powell
Assistant Examiner—Douglas Blair
(74) Attorney, Agent, or Firm—Martin & Associates, LLC (57) ABSTRACT

An object oriented framework mechanism for distributing and managing operations of a network application defines classes and class relationships that provide for easily extending the framework to define new heterogeneous operations in a network application. Core functions of the framework mechanism support operation management functions, which may include status reporting, error recovery, scheduling, reexecution of previously-defined operations, persistence of operations, and sharing of operations between users. The framework mechanism provides extensible functions that are extended by a user to define a network application. A network application can thus be defined by a user that supports any or all of the above-mentioned operation management functions without explicitly providing these functions, because these functions are part of the core function of the framework mechanism.

36 Claims, 8 Drawing Sheets

OBJECT ORIENTED FRAMEWORK MECHANISM AND METHOD FOR DISTRIBUTING AND MANAGING HETEROGENOUS OPERATIONS OF A NETWORK APPLICATION

BACKGROUND OF THE INVENTION

1. Technical Field

The present invention relates in general to the data processing field. More specifically, the present invention relates to the field of object oriented frameworks.

2. Background Art

Since the dawn of the computer age, computer systems have become indispensable in many fields of human endeavor including engineering design, machine and process control, and information storage and access. In the early days of computers, companies such as banks, industry, and the government would purchase a single computer which satisfied their needs, but by the early 1950's many companies had multiple computers and the need to move data from one computer to another became apparent. At this time computer networks began being developed to allow computers to work together.

Computer networks allow low cost personal computer systems to connect to larger computer systems to perform tasks that such low cost systems could not perform alone. Most companies in the United States today have one or more computer networks. The topology and size of the networks may vary according to the computer systems being networked and the design of the system administrator. It is very common, in fact, for companies to have multiple computer networks. Many large companies have a sophisticated blend of local area networks (LANs) and wide area networks (WANs) that effectively connect most computers in the company to each other.

Networked computers are capable of processing special software known as network applications. A network application is computer software that is intended to be run on several different computer systems that are interconnected on a network. One example of a network application is system administration software that makes software updates on many different computer systems on the network. Known network applications are custom computer programs that are tailored to performing specific, predefined operations. If new types of operations need to be added to the network application, the network application code must be manually reprogrammed to include these new operations. Modifying the network application is necessary anytime the function of the network application needs to be changed. Without a mechanism for easily and efficiently extending the function of a network application, the time and resources required to add functions to network applications will be excessive.

DISCLOSURE OF INVENTION

According to the present invention, an object oriented framework mechanism for distributing and managing operations of a network application defines classes and class relationships that provide for easily extending the framework to define new heterogeneous operations in a network application. Core functions of the framework mechanism support operation management functions, which may include status reporting, error recovery, scheduling, reexecution of previously-defined operations, persistence of operations, and sharing of operations between users. The framework mechanism provides extensible functions that are extended by a user to define a network application. A network application can thus be defined by a user that supports any or all of the above-mentioned operation management functions without explicitly providing these functions, because these functions are part of the core function of the framework mechanism.

The foregoing and other features and advantages of the invention will be apparent from the following more particular description of preferred embodiments of the invention, as illustrated in the accompanying drawings.

BEST MODE FOR CARRYING OUT THE INVENTION

Overview—Object-Oriented Technology

The present invention was developed using object oriented (OO) technology. Individuals skilled in the art of OO technology may wish to proceed to the Detailed Description section of this specification. However, those individuals who are new to OO technology should read this overview section in order to best understand the benefits and advantages of the present invention.

Object Oriented Technology v. Procedural Technology

In general, OO technology is significantly different than conventional, process-based technology (often called procedural technology). While both technologies can be used to solve the same problem, the ultimate solutions to the problem are always quite different. This difference stems from the fact that the design focus of procedural technology is wholly different than that of OO technology. The focus of process-based design is on the overall process that solves the problem; whereas, the focus of OO design is on how the problem can be broken down into a set of autonomous entities that can work together to provide a solution. The autonomous entities of OO technology are called objects.

Said another way, OO technology is significantly different from procedural technology because problems are broken down into sets of cooperating objects instead of into hierarchies of nested computer programs or procedures.

The Term Framework

There has been an evolution of terms and phrases that have particular meaning to those skilled in the art of OO design. However, the reader should note that one of the loosest definitions in the OO art is the definition of the word framework. The word framework means different things to different people. Therefore, when comparing the characteristics of two supposed framework mechanisms, the reader should take care to ensure that the comparison is indeed "apples to apples." As will become more clear in the forthcoming paragraphs, the term framework is used in this specification to describe an OO mechanism that has been designed to have core function and extensible function. The core function is that part of the framework mechanism that is not subject to modification by a user of the framework. The extensible function, on the other hand, is that part of the framework mechanism that has been explicitly designed to be customized and extended by a user.

Framework Mechanisms

While in general terms an OO framework mechanism can be properly characterized as an OO solution, there is nevertheless a fundamental difference between a framework mechanism and a basic OO solution. The difference is that framework mechanisms are designed in a way that permits and promotes customization and extension of certain aspects of the solution. In other words, framework mechanisms amount to more than just a solution to the problem. The mechanisms provide a living solution that can be customized and extended to address individualized requirements that change over time. Of course, the customization/extension quality of framework mechanisms is extremely valuable to users of the framework because the cost of customizing or extending a framework is much less than the cost of replacing or reworking an existing solution.

Therefore, when framework designers set out to solve a particular problem, they do more than merely design individual objects and how those objects interrelate. They also design the core function of the framework (i.e., that part of the framework that is not to be subject to potential customization and extension by the framework consumer) and the extensible function of the framework (i.e., that part of the framework that is to be subject to potential customization and extension). In the end, the ultimate worth of a framework mechanism rests not only on the quality of the object design, but also on the design choices involving which aspects of the framework represent core function and which aspects represent extensible function.

Notation

There is, as yet, no uniformly accepted notation for communicating object-oriented programming ideas. The notation used in this specification is very similar to that known in the programming industry as Booch notation, after Grady Booch. Mr. Booch is the author of *Object-Oriented Analysis and Design With Applications*, 2nd ed. (1994), available from The Benjamin/Cummings Publishing Company, Inc. Use of Booch notation concepts within this specification should not be taken to imply any connection between the inventors and/or the assignee of this patent application and Mr. Booch or Mr. Booch's employer. The notational system used by Mr. Booch is well-known in the art, and is more fully explained at Chapter 5, pp. 171–228 of the aforementioned book.

It bears mention that the Booch notation includes interaction diagrams that trace the execution of objects and classes. Interaction diagrams are essentially restructured object diagrams. That is, interaction diagrams do not convey any additional information from that conveyed by object diagrams, but simply present the same information in a different format. The present specification makes use of object diagrams rather than interaction diagrams, but those skilled in the art will recognize that they are equivalent and also will understand how to convert from one to the other without further explanation.

DETAILED DESCRIPTION

According to a preferred embodiment of the present invention, an object oriented operation manager framework mechanism provides extension points for a user to define a network application. The core function of the framework defines functions that may not be changed by a user. Once a network application is defined by extending the extensible classes in the framework, new operations or network applications may be easily added that take advantage of the previously-defined functions without having to reprogram these functions. Examples of functions provided in the framework include: status reporting, error recovery, scheduling, reexecution of tasks that were interrupted or that need to be executed again, persistence of tasks, and sharing of tasks. By providing support for these functions in the framework, defining one network application by extending the framework results in portions that may be used by other operations or network applications that are later defined. In other words, once a network application is defined using the framework, new operations or network applications may benefit from the previous work by defining user extensions to some of the extensible classes in the framework. These new operations or application can then use the previously-defined functions supported in the framework.

Figure 1:
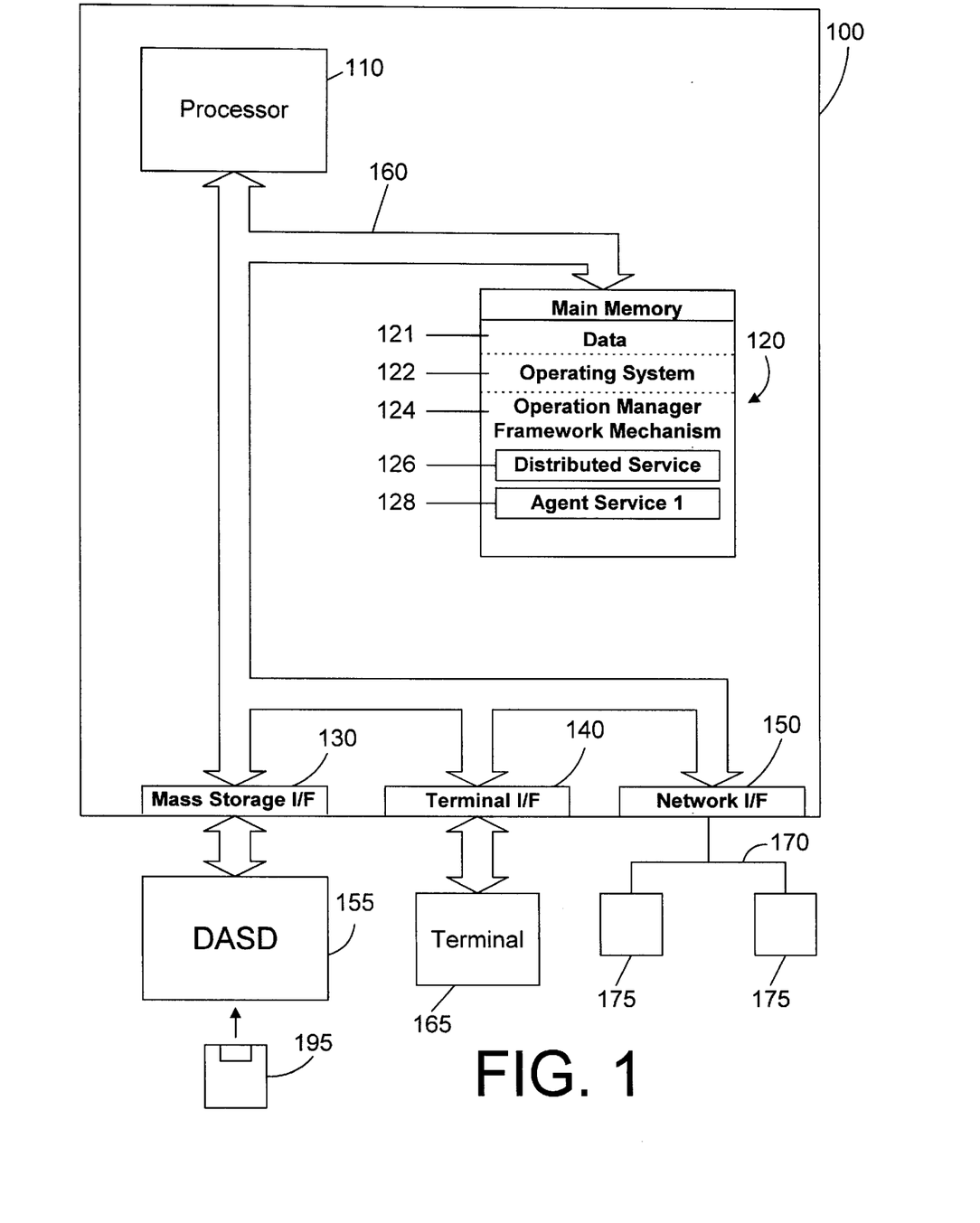
FIG. 1 is a block diagram of an apparatus in accordance with a preferred embodiment of the present invention.

Referring to FIG. 1, a computer system 100 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device 155 is a floppy disk drive, which may store data to and read data from a floppy disk 195.

Main memory 120 in accordance with the preferred embodiments contains data 121, an operating system 122, and an operation manager framework mechanism 124. Framework mechanism 124 includes a distributed service 126 and a corresponding agent service 128. Distributed service 126 is software that defines a service that may become a task in the network application as needed. Agent service 128 is software that runs on a computer system to perform specific work on the computer system that is part of a task defined by the distributed service 126. In the preferred embodiments, the distributed service 126 runs on a central computer system, while one or more agent services 128 run on computer systems on the network (referred to herein as "end point systems") to perform the task defined by distributed service 126. In other words, the distributed service 126 defines a task, and the agent service 128 is the mechanism for performing the task or a sub-portion of the task on one or more computer systems on the network.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, and operation manager framework mechanism 124 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system.

Operation manager framework mechanism 124 is a framework for generating a network application that manages and distributes heterogeneous operations in the network application. The term "heterogeneous operations" is used herein to convey that framework mechanism 124 supports many different types of diverse operations in a network application. Note that the terms "operation", "task", and "service" are used interchangeably herein.

Framework mechanism 124 includes predefined classes that are extended by a user to generate a user-defined distributed service 126 and a corresponding agent service 128. The agent service 128 is preferably run under the control of the distributed service 126. The logic for the distributed service 126 to interact with the agent service 128 is part of the core function of the operation manager framework mechanism 124. This core function, when combined with the user-defined extensions, provides executable code that is a network application. Once a network application is defined using the framework mechanism 124, the defined functions within framework mechanism 124 may be re-used by any other network application that may be added by extending the framework mechanism 124. This allows a programmer to avoid programming the low-level control aspects of network applications each time a new operation or network application needs to be defined.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, one or more portions shown in main memory 120 may reside on another system and engage in cooperative processing with one or more objects or programs that reside on computer system 100. This cooperative processing could be accomplished through use of one of the well known client-server mechanisms such as remote procedure call (RPC).

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 2:
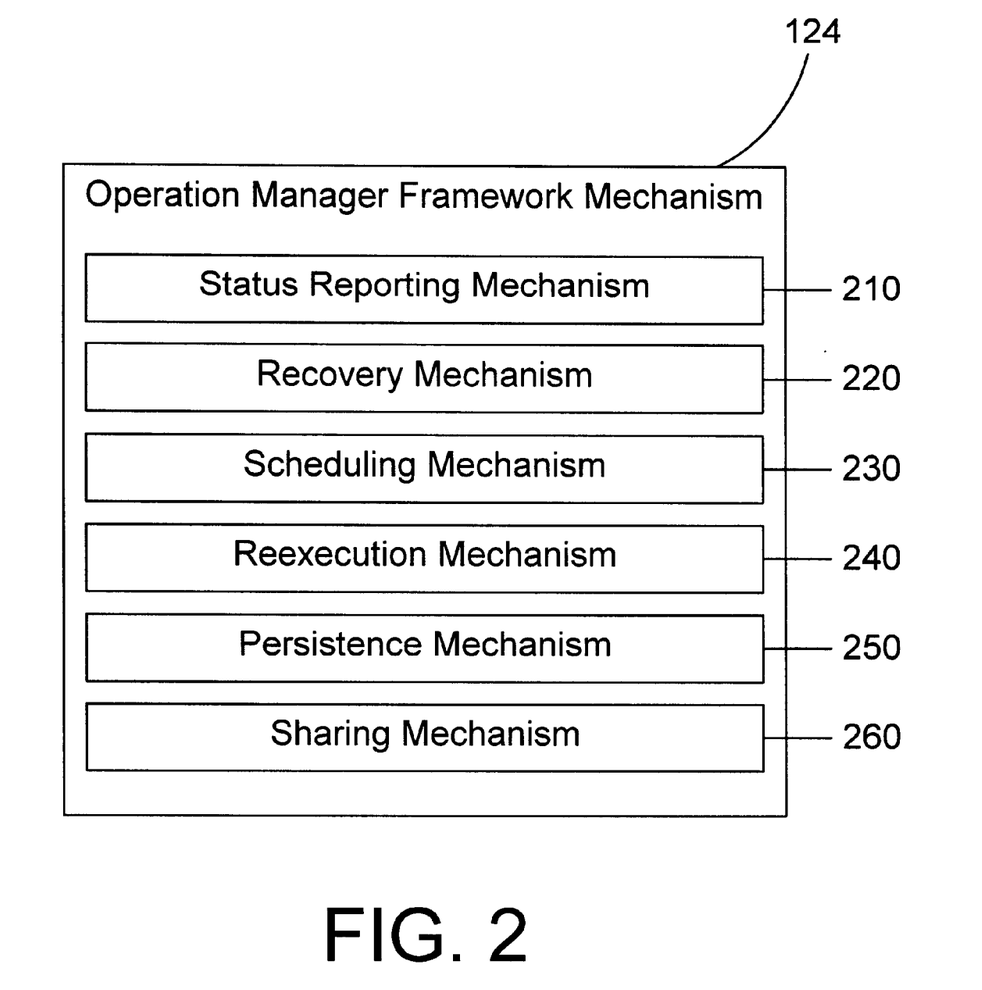
FIG. 2 is a block diagram showing some of the mechanisms that may be included in the operation manager in accordance with the preferred embodiments.

Referring to FIG. 2, framework mechanism 124 may include many different mechanisms that provide basic functions that are common to many operations in a network application. For example, a status reporting mechanism 210 within framework mechanism 124 allows the progress of operations to be reported as required. For example, if a system administrator initiates an operation in a network application on fifty different computer systems, the status reporting mechanism 210 can report: the progress of completing the overall operation (i.e., was the operation carried out successfully on all fifty computer systems?); the progress of completing the operation on a particular computer systems (i.e., why is the operation taking so long, and is it still running?); and whether or not the operation failed on any of the fifty computer systems. These are simply given as examples of different types of status that may be reported by status reporting mechanism 210. The preferred embodiment of status reporting mechanism 210 expressly encompasses any means for reporting any status related to an operation in a network application. Status reporting mechanism 210 thus provides information about the network application that can be reported or logged, and appropriate corrective actions can then be taken as required.

Recovery mechanism 220 monitors a task as it is being executed, and periodically logs the state of the task so that the degree of completion can be determined if there is a system or communications failure that interrupts the execution of the task. If such a failure occurs, recovery mechanism 220 reads the latest logged state of the task, and can then determine from this state whether the task needs to be reexecuted entirely, or whether the task had completed to a known state that leaves only a portion of the task to be performed. Note that recovery mechanism 220 uses persistence mechanism 250, discussed below, to log the state of the task to a persistent store.

Scheduling mechanism 230 allows any task to be initiated by a scheduler. Many times, a user may want to perform an operation immediately. Other times, the user may want to schedule a task to be performed at a later time. Note that the specific implementation of the scheduler is not important. Any suitable scheduler could be used. Framework mechanism 124 is designed to support invocation of tasks by a scheduler using scheduling mechanism 230. By building scheduling mechanism 230 into the framework 124, any new task that is defined using the framework can also be scheduled without any explicit effort by the programmer.

Reexecution mechanism 240 is used to reexecute a task that was previously defined. When a task is defined, the task is stored in a persistent store. If the task needs to be reexecuted, it can be retrieved from the persistent store and executed. For example, if a network error occurs, if the power is interrupted, or if any other errors occur that preclude a task from completing, reexecution mechanism 240 may be used to repeat the interrupted task. In addition, reexecution mechanism 240 also allows common tasks to be performed periodically without having to define the task each time it is to be run. In addition, reexecution mechanism 240 is used to support the scheduling of tasks on a recurring basis by scheduling mechanism 230.

Persistence mechanism 250 is used to store a newly-created task in a persistent store so it can be retrieved for later use. Each time a task is created, persistence mechanism 250 automatically stores a persistent copy of the task in the persistent store. The storage of a task in the persistent store is a core function of the framework that cannot be modified by the user. Thus, each task that is created is stored away for future use so that the same task need not be re-created each time it needs to be run.

Sharing mechanism 260 provides a way for different users to share tasks. Sharing mechanism 260 preferably defines different levels of sharing. Examples of different levels of sharing include: 1) no sharing; 2) view only; 3) view and change. If the sharing level is set to no sharing, the task will not be shared with other users. If the sharing level is set to view only, another user may only view the tasks being run, but cannot change them. If the sharing level is view and change, another user can both view and change the tasks being run. Note that sharing levels can be defined for groups of users on a network, or can be defined for individual users. Sharing mechanism 260 is especially useful for tasks that require a long time to complete. For example, a user can start a long task during his or her shift. When the next shift comes to work, a person in. that shift can then view and/or change the task if that person is authorized to share that task. In this manner the person in the second shift might initiate another task that depends on the first task being completed, rather than waiting for the first person to initiate the task when he or she returns to work.

In the preferred embodiment, framework mechanism 124 includes all of the mechanisms defined in FIG. 2. However, it is equally within the scope of the invention for framework mechanism 124 to include a specific subset of the mechanisms in FIG. 2. Note that the mechanisms shown in FIG. 2, if present within the framework mechanism 124, are core functions that cannot be modified by a user.

Figure 3:
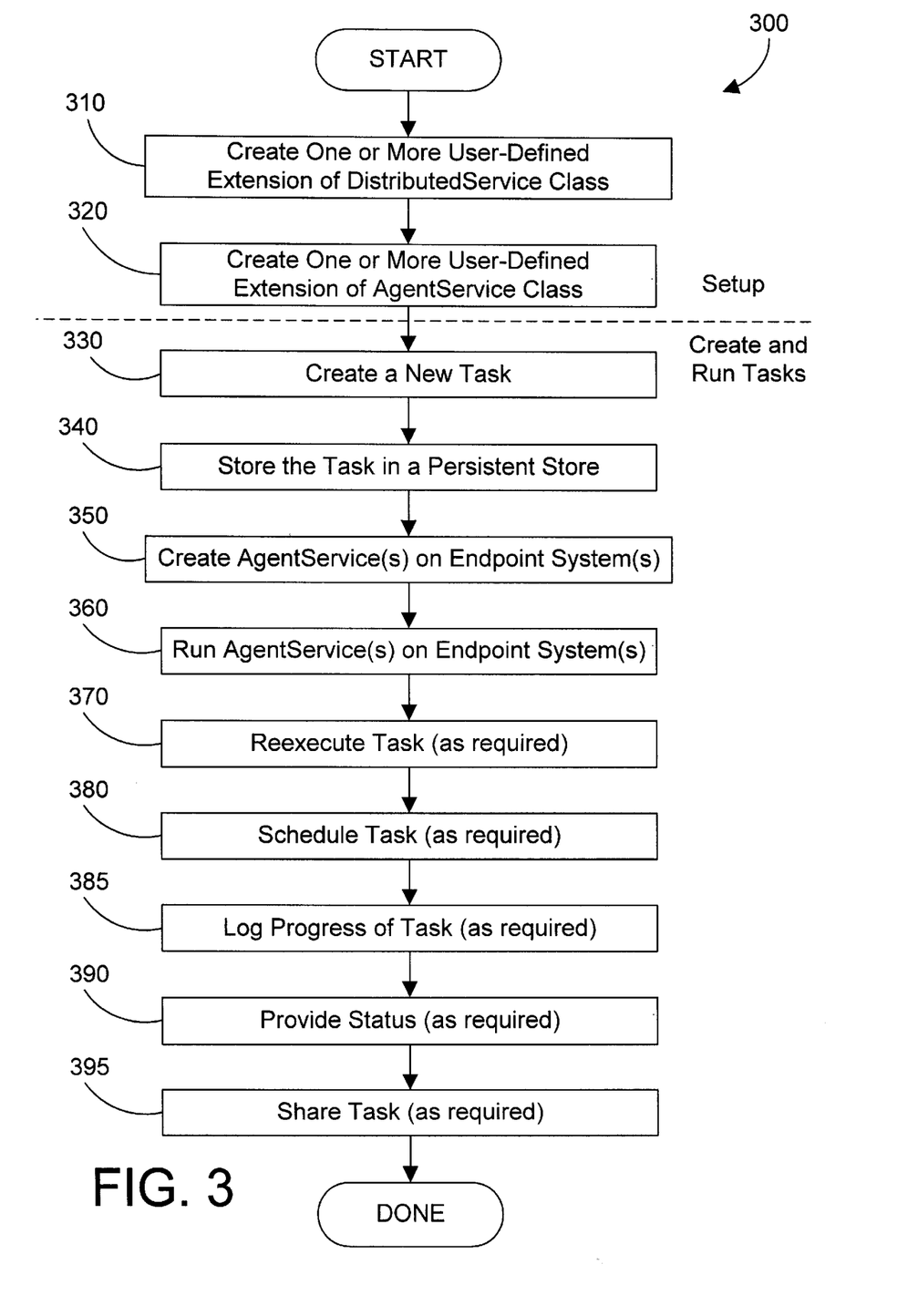
FIG. 3 is a flow diagram showing the steps in extending the framework to define a network application, and in running the network application.

Referring to FIG. 3, a method 300 defines the steps for extending framework mechanism 124 and for using the resulting network application. To extend the framework mechanism 124, first one or more user-defined extensions of a DistributedService class are defined (step 310). Next, one or more user-defined extensions of an AgentService class is defined (step 320). The combination of the DistributedService subclass and the AgentService subclass define a network application. Steps 310 and 320 are the steps that are performed for setting up the network application, while the remaining steps are the steps in executing the network application, as shown by the horizontal dotted line.

Once a network application is defined by appropriately extending framework mechanism 124 in steps 310 and 320, a new task can be created (step 330). This new task can be created by a user performing some action on a user interface, or could be created by a software process. Once the task is created, it is stored in a persistent store (step 340). This creates a persistent version of the task that can be invoked later if the task does not run to completion or if the task needs to be repeated (such as when a scheduler periodically invokes a task). The storage of the task in persistent store in step 340 is preferably performed by the persistence mechanism 250 discussed above with reference to FIG. 2.

Once the task has been created, an agent service corresponding to the task is created on each computer system (referred to herein as an "end point system") that is to execute the task or a portion of the task (step 350). The agent service is then run on the end point systems (step 360). Steps 330–360 are the steps in creating and executing a task (or operation) in a network application. The remaining steps 360–395 are performed as required by the task, by user settings, and by system parameters.

Step 370 reexecutes a task as required by retrieving the persistent version of the task from the persistent store, and by invoking the task anew. The reexecute task step 370 corresponds to the functions performed by reexecution mechanism 240 discussed above with reference to FIG. 2.

Step 380 schedules tasks for later execution as required. Note that step 380 is performed by any suitable scheduler, but the scheduler interfaces with the framework by invoking the scheduling mechanism 230 discussed above with reference to FIG. 2. Step 385 logs progress information about a task that is being executed. Step 385 corresponds to the functions performed by recovery mechanism 220 discussed above with reference to FIG. 2.

Step 390 provides status information about a task that is being executed. Step 390 corresponds to the functions performed by status reporting mechanism 210 discussed above with reference to FIG. 2. Step 395 allows sharing of tasks between users, and corresponds to the functions performed by sharing mechanism 260 discussed above with reference to FIG. 2.

Note that steps 360–395 are shown in FIG. 3 to occur in a particular sequence. However, one skilled in the art will recognize that any or all of these steps may be performed in any order. These steps are included in method 300 to indicate that each of these steps may be performed by framework mechanism 124. While the preferred embodiment of framework mechanism 124 includes all of these steps, none of these individual steps is required for the invention, and providing any subset of these steps (including none of them) is within the scope of the present invention.

Figure 4:
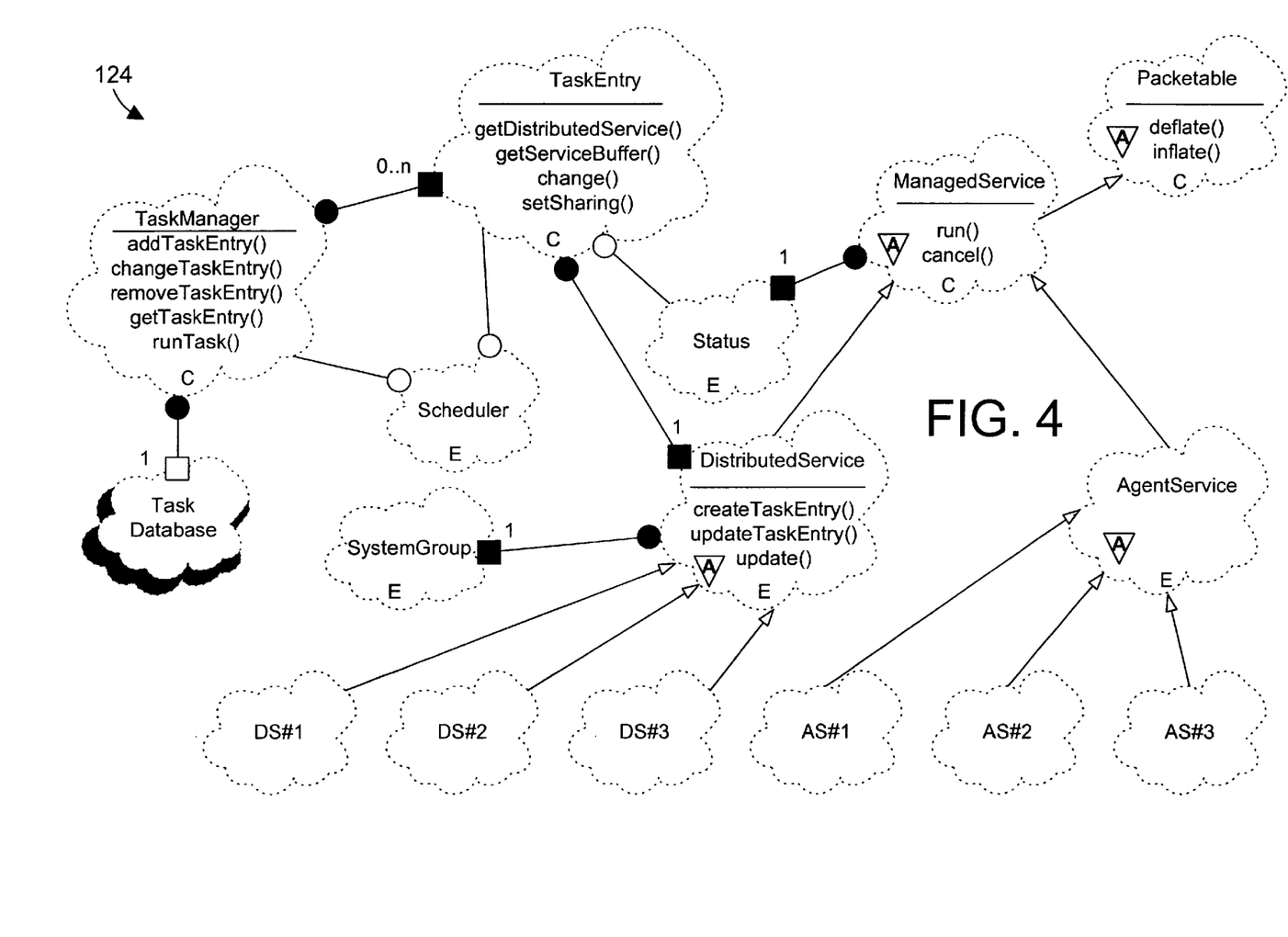
FIG. 4 is a class diagram showing the preferred implementation of the operation manager framework mechanism 124 of FIG. 1 showing three specific user-defined extensions.

Referring now to FIG. 4, a class diagram shows one specific implementation of the operation manager framework mechanism 124 of FIG. 1 in accordance with a preferred embodiment. Operation manager framework mechanism 124 includes a TaskManager class that references a task database and that contains a list of TaskEntry objects. The TaskDatabase is shown in FIG. 4 as a class utility, indicating that the task database may be a non-object oriented database, such as a relational database. Of course, TaskDatabase could also be an object oriented database as well. In the remaining figures, the task database is shown as a TaskDatabase object, recognizing that this object may be an interface to a non-object oriented database. The TaskManager class defines an addTaskEntry( ) method that is used to add a TaskEntry object to its list of task entries. A changeTaskEntry( ) method is called to change a task entry in its list, which is useful to reflect the status of the task as it executes. A removeTaskEntry( ) method is called to remove a task entry from its list. A getTaskEntry( ) method is invoked to return a task entry from the list. A runTask( ) method executes a task on the list. The TaskManager is a core class of the framework 124, meaning that a user cannot change the implementation of the TaskManager.

The TaskEntry class is a thin wrapper class around the DistributedService object that it contains. A TaskEntry instance contains a pointer to the corresponding DistributedService object, and thus has access to all features of the DistributedService object, including its status. The TaskEntry class defines a getaDistributedService( ) method which is invoked to return a distributed service that corresponds to a specified task. A getServiceBuffer( ) method is called to identify which buffer in the persistent store corresponds to a specified distributed service. A change( ) method is invoked when the state of the TaskEntry object changes, typically due to a change in the status of a task that is running. A setSharing( ) method is invoked to set appropriate sharing levels for one or more users or for a group of users. The TaskEntry class has a uses relationship with a Status class, indicating that a TaskEntry instance may use status instances. The TaskEntry class is a core class of the framework 124 that cannot be modified by a user.

A scheduler class is defined within framework 124 that has a uses relationship with the TaskManager class and the TaskEntry class. The scheduler class can define any suitable scheduler that can initiate task execution by invoking the appropriate methods on the TaskManager and TaskEntry classes.

A Packetable class is an abstract class that defines a deflate( ) method that is invoked when a transient object needs to be serialized (i.e., put into a packet) for storage in a persistent store. An inflate( ) method is also defined that is called to turn a packet retrieved from the persistent store into a transient object. The Packetable class is similar to the Serializable class defined in the Java programming language, and simply provides a convenient way to convert an object to flat data that can be stored in a relational database, as well as a way to use flat data read from the relational database to create an object. The Packetable class is a core class of the framework that cannot be modified by a user.

The ManagedService abstract class is a subclass of Packetable, and defines a run( ) method for initiating execution of a managed service, and a cancel( ) method for canceling the execution of a managed service. The ManagedService class has a contains relationship with the Status class, indicating that a ManagedService instance has a corresponding Status instance.

DistributedService and AgentService are both abstract subclasses of the ManagedService class, which means that both inherit the deflate( ), inflates( ), run( ), and cancel( ) methods of their parents. The DistributedService class includes a createTaskEntry( ) method that is invoked when a DistributedService instance is to be converted to a task. Calling the createTaskEntry( ) method creates a TaskEntry instance and places the TaskEntry instance in the list of tasks in the TaskManager, and stores a deflated version of the DistributedService instance in the TaskDatabase. An updateTaskEntry( ) method is provided to update the state of a TaskEntry instance that corresponds to the DistributedService when the state of the TaskEntry needs to be changed (such as when a status update is received). An update( ) method is called to initiate a change in status of a DistributedService instance. The DistributedService class has a contains relationship with a SystemGroup class, which is an extensible class that specifies the computer systems on the network that may be used as end point systems for executing the network application. The DistributedService class is an extensible class that must be extended by a user to define a desired network application processing environment.

The AgentService class is an abstract class that defines program code that will run on one or more of the end point systems specified in the SystemGroup to execute the task corresponding to the DistributedService. In the preferred embodiments, a user extends framework 124 by providing two subclasses, a DistributedService subclasses and an AgentService subclass. Note that framework 124 provides other extension points as well, such as SystemGroup, Scheduler, and Status. However, these other extension points only need to be defined once. These other extension points may have default behavior provided in the framework 124 itself, or may be defined by the first network application that is created using the framework. However the Scheduler, Status, and SystemGroup are initially defined, once defined they can be used by other network applications. In fact, this is one of the great attractions for defining framework 124 in this manner—once the operation management functions are defined in the framework 124, other network applications can be defined by providing only two concrete subclasses, namely DistributedService and AgentService, and the mechanisms for reporting status, recovery, scheduling, reexecution, persistence, and sharing that are already defined in the framework 124 may be used in a newly-defined network application. In the preferred embodiment, a network application is defined by a single DistributedService subclass and a corresponding AgentService subclass. However, it is equally within the scope of the invention to have multiple AgentService subclasses that correspond to a single DistributedService subclass. In FIG. 4, a first distributed service subclass DS#1 is defined, and a corresponding agent service subclass AS#1 is defined. The two together define a network application using framework 124. In similar fashion, DS#2 and AS#2 define a second network application, while DS#3 and AS#3 define a third network application. These subclasses DS#1, DS#2, and DS#3 represent user-defined concrete subclasses of the DistributedService class, while AS#1, AS#2, and AS#3 represent user-defined concrete subclasses of the AgentService class that correspond to their respective DistributedService subclasses.

Figure 5:
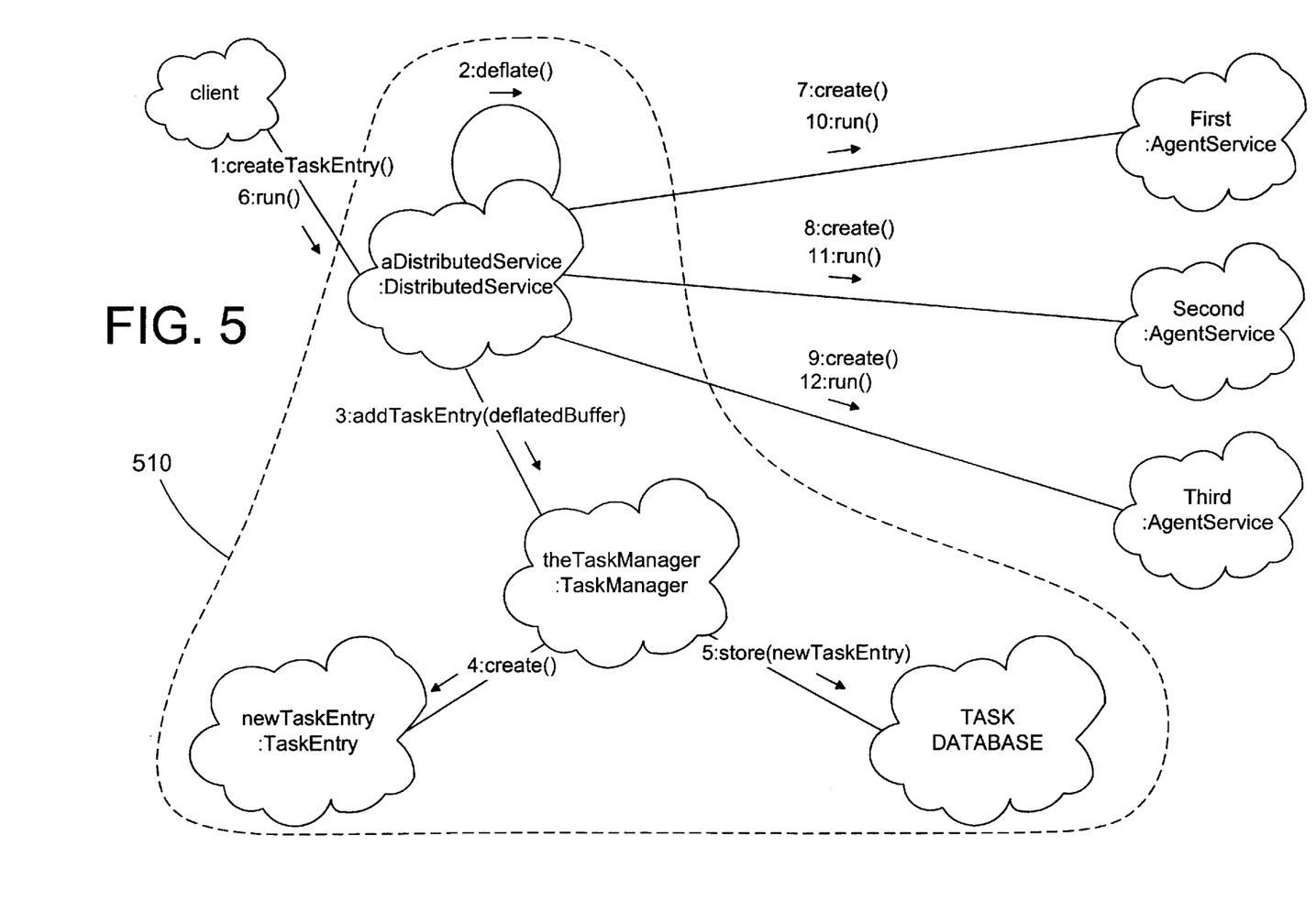
FIG. 5 is an object diagram that includes the steps in accordance with the preferred embodiments to create and run a task in a network application.

Referring now to FIG. 5, an object diagram shows the interaction of instances of the classes of FIG. 4 when a task needs to be created. We assume that some client object first invokes a createTaskEntry( ) method on an instance of DistributedService to turn the distributed service into a task (step 1). The client object in the figures represents any object or computer program or user command that can call methods on the objects shown. In response to calling the createTaskEntry( ) method in step 1, the DistributedService object invokes its deflate( ) method (step 2) to generate a serialized version of itself that can be stored in a flat data store, such as a relational database. The DistributedService object then invokes the addTaskEntry( ) method on the TaskManager object, passing the deflated buffer generated in step 2 as a parameter. The TaskManager object then generates a unique task identifier (taskId), and uses the deflated buffer to create a transient newTaskEntry object that corresponds to the DistributedService object and that includes the taskId (step 4). The TaskManager object then stores the newTaskEntry object in the TaskDatabase (step 5), which includes the deflatedBuffer passed in step 3.

Once steps 1–5 of FIG. 5 are complete, the DistributedService has been used to generate a corresponding task (newTaskEntry), and that task can then be executed by the client invoking the run( ) method on the DistributedService object (step 6). The DistributedService then looks at its contained SystemGroup instance to determine which computer systems on the network are end point systems for this task. For the example in FIG. 5, we assume that the SystemGroup includes three computer systems. The DistributedService instance then creates an AgentService instance on the first computer system in the SystemGroup (step 7), creates an AgentService instance on the second computer system in the SystemGroup (step 8), and creates an AgentService instance on the third computer system in the SystemGroup (step 9). Note that these three instances are preferably instances of the same AgentService concrete subclass. Once these AgentService instances are created on the respective end point computer systems, they are each run (steps 10, 11 and 12), thereby causing the DistributedService to be performed on each end point computer system in the SystemGroup.

In the preferred embodiment, the DistributedService object, TaskManager object, TaskEntry object, and Task Database all reside on a special computer system referred to herein as a "central server" 510. This central server is a server in the sense of receiving client commands to create and run task entries, and creating agent services on the end point systems specified in the SystemGroup. Each end point system is assumed to be a separate computer system in the preferred embodiment. Thus, for the example of FIG. 5 in accordance with the preferred embodiments, there are five separate computer systems: one for the client, one central server 510, and one for each end point system. Of course, this configuration is shown by way of example. The client that invokes the createTaskEntry( ) method on the DistributedService object may actually be on the central server 510, or may be on one of the end point systems. In addition, the central server 510 may reside on one of the end point systems as well. Regardless of the particular configuration, the preferred embodiments extend to any physical configuration for the classes shown in FIG. 5, which are shown as one suitable implementation for creating an operation (or task) in a network application.

As the steps in FIG. 5 illustrate, a DistributedService is an operation in a network application that may need to be performed on a number of different end point computer systems in the network. The operation represented by DistributedService is performed by creating an agent service that corresponds to the distributed service on each of the end point systems, and by executing the agent services on each end point system. One example of a network application that can be implemented using framework 124 is an application for providing software updates on computer systems on the network. Let's assume that a new version of a compiler is available, and that 100 end point systems that are defined by a SystemGroup need to all be updated with the new version of the compiler. A concrete DistributedService subclass is defined with the logic to perform the updates, and a corresponding concrete AgentService subclass is defined to actually carry out the updates on each end point system. Note that the AgentService may perform different functions on different end point systems depending on the amount of available hard disk space, the software currently installed, etc. In other words, AgentService may include logic for customizing the task to a particular end point system. To update the compiler on these 100 end point systems, an instance of the concrete DistributedService class is created, and an instance of the corresponding concrete AgentService class is created on each end point system. The agent services on the end point systems are then executed, and status is reported back to the DistributedService on the central system 510.

Figure 6:
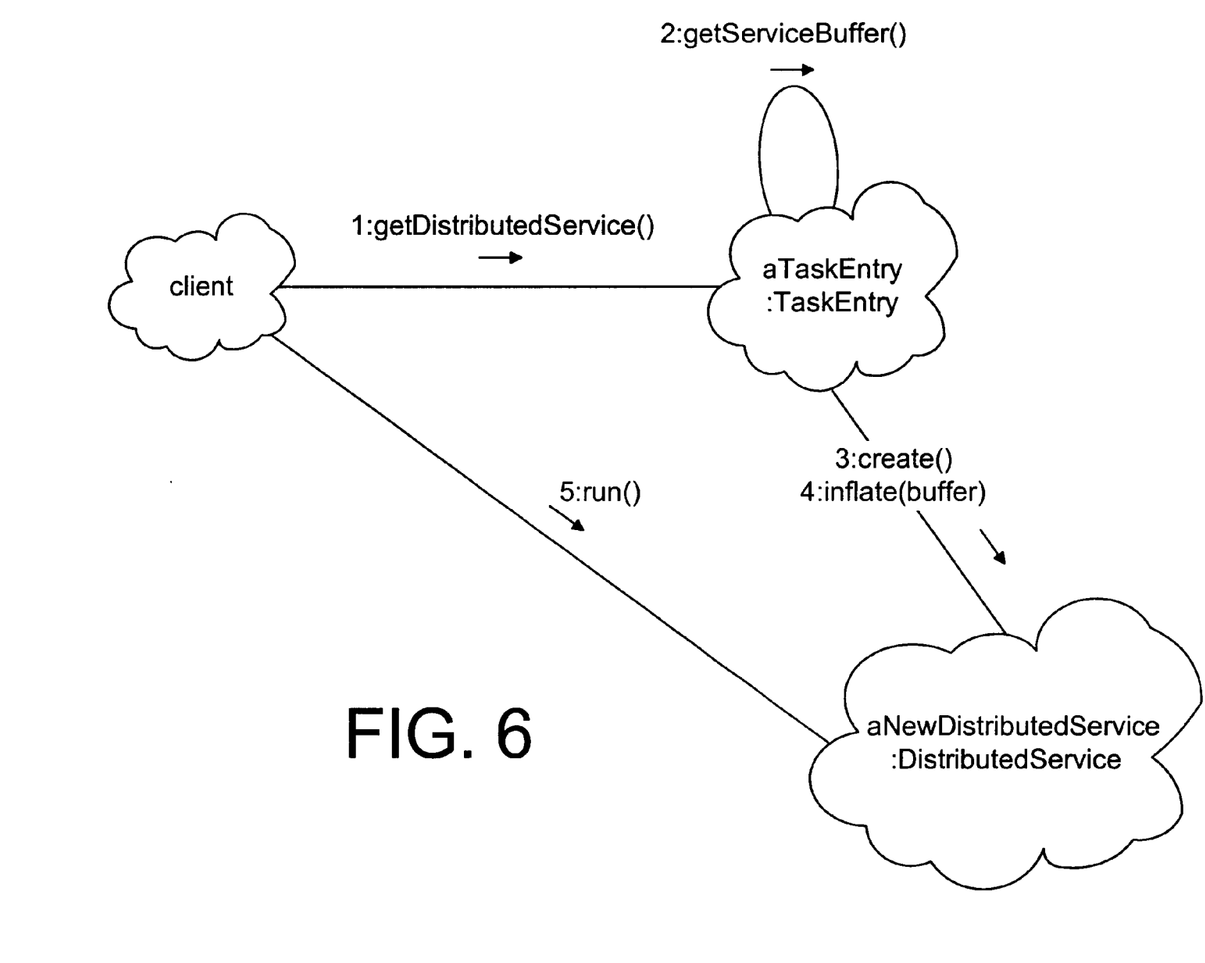
FIG. 6 is an object diagram that includes the steps in accordance with the preferred embodiments for reexecuting a previously-defined task in a network application.

Referring to FIG. 6, the steps for reexecuting a task are shown. First, a client object invokes the getDistributedService( ) method on a TaskEntry object (step 1). The TaskEntry object invokes its own getServiceBuffer( ) method (step 2) to retrieve the service buffer for the DistributedService that corresponds to the TaskEntry object. Next, the constructor method create( ) on the DistributedService class is invoked (step 3) to create aNewDistributedService instance. At this point the aNewDistributedService instance is inflated with the previously-stored data by invoking its inflate( ) method (step 4), passing the service buffer retrieved in step 2 as a parameter. The aNewDistributedService instance is thus an exact copy of a DistributedService instance that was created previously and stored in the persistent store as a task entry. Once the aNewDistributedService instance is inflated, the client invokes the run( ) method (step 5). The reexecution steps in FIG. 6 thus allow an operation that was previously defined to be reexecuted at a later time without the need for new user input. This is especially useful for periodic scheduled tasks, and avoids having to create the task each time it is used.

Figure 7:
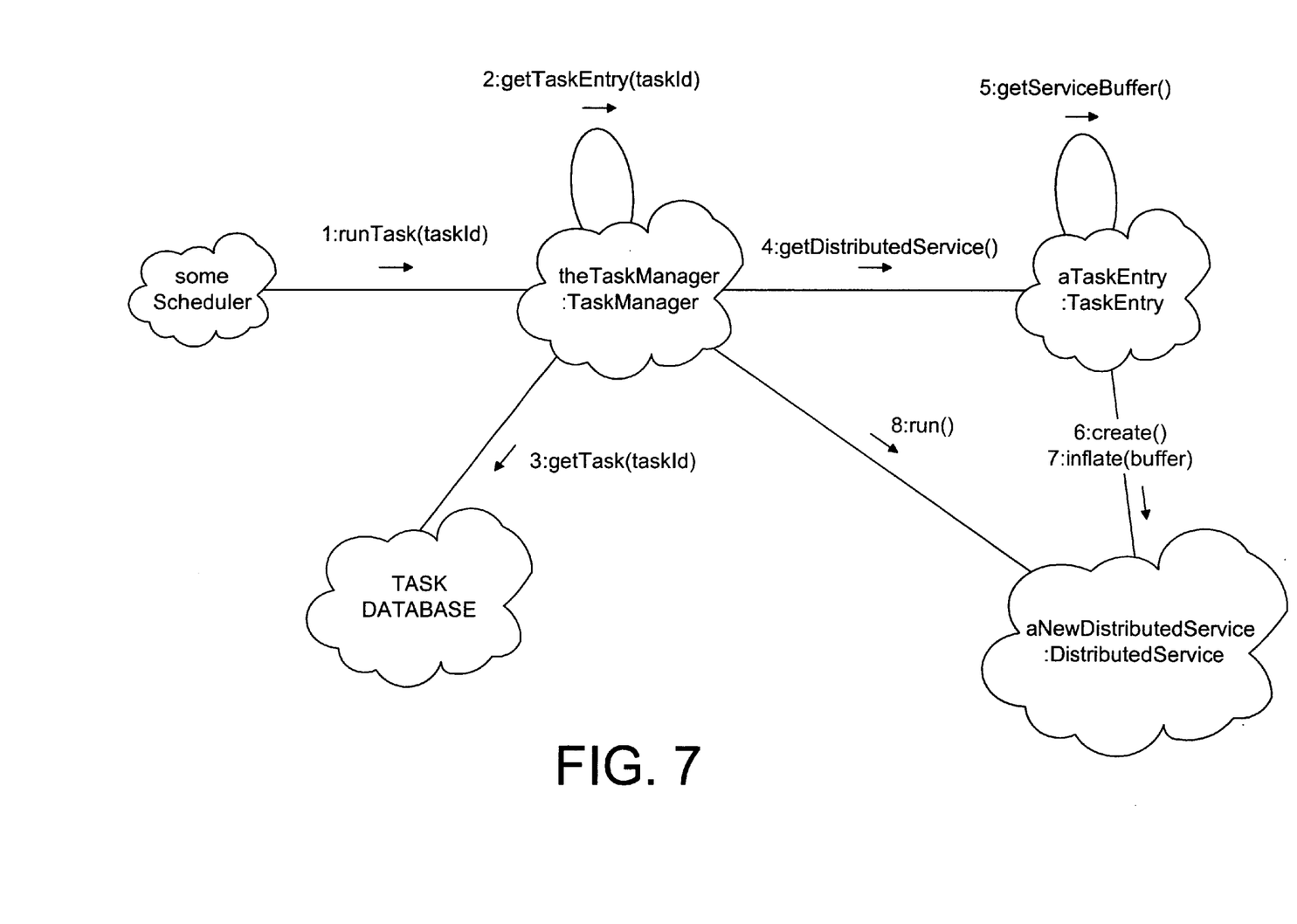
FIG. 7 is an object diagram that includes the steps in accordance with the preferred embodiments for a scheduler to run a task in a network application.

Referring to FIG. 7, steps are disclosed that are performed when a scheduler requests a specific task to be run. We assume that a scheduler instance someScheduler invokes the runTasko method on the TaskManager instance, passing the task identifier (taskId) as a parameter (step 1). In response, the TaskManager object invokes its own getTaskEntry( ) method, passing the taskid as a parameter (step 2). The TaskManager object then invokes the getTask( ) method on the task database, passing the taskId as a parameter (step 3). The task entry corresponding to the taskId is then returned to the TaskManager. Next, the TaskManager object invokes the getDistributedService method on the TaskEntry that corresponds to the taskId (step 4). The TaskEntry object invokes its own getServiceBuffer( ) method to identify the buffer that contains the flat data for the corresponding distributed service (step 5). The TaskEntry object then invokes the constructor method on the DistributedService class (step 6), which creates aNewDistributedService. The TaskEntry object then invokes the inflate( ) method on the newly-created aNewDistributedService object, passing the buffer retrieved in step 5 as a parameter. At this point the aNewDistributedService object is an exact copy of a previously-store distributed service object, and can be run to perform the same task (step 8). The steps in FIG. 7 illustrate steps in accordance with the preferred embodiment for creating and running a task when requested by a scheduler. This process of creating and running a task when requested by a scheduler is a core function of framework 124 that cannot be modified by a user.

Figure 8:
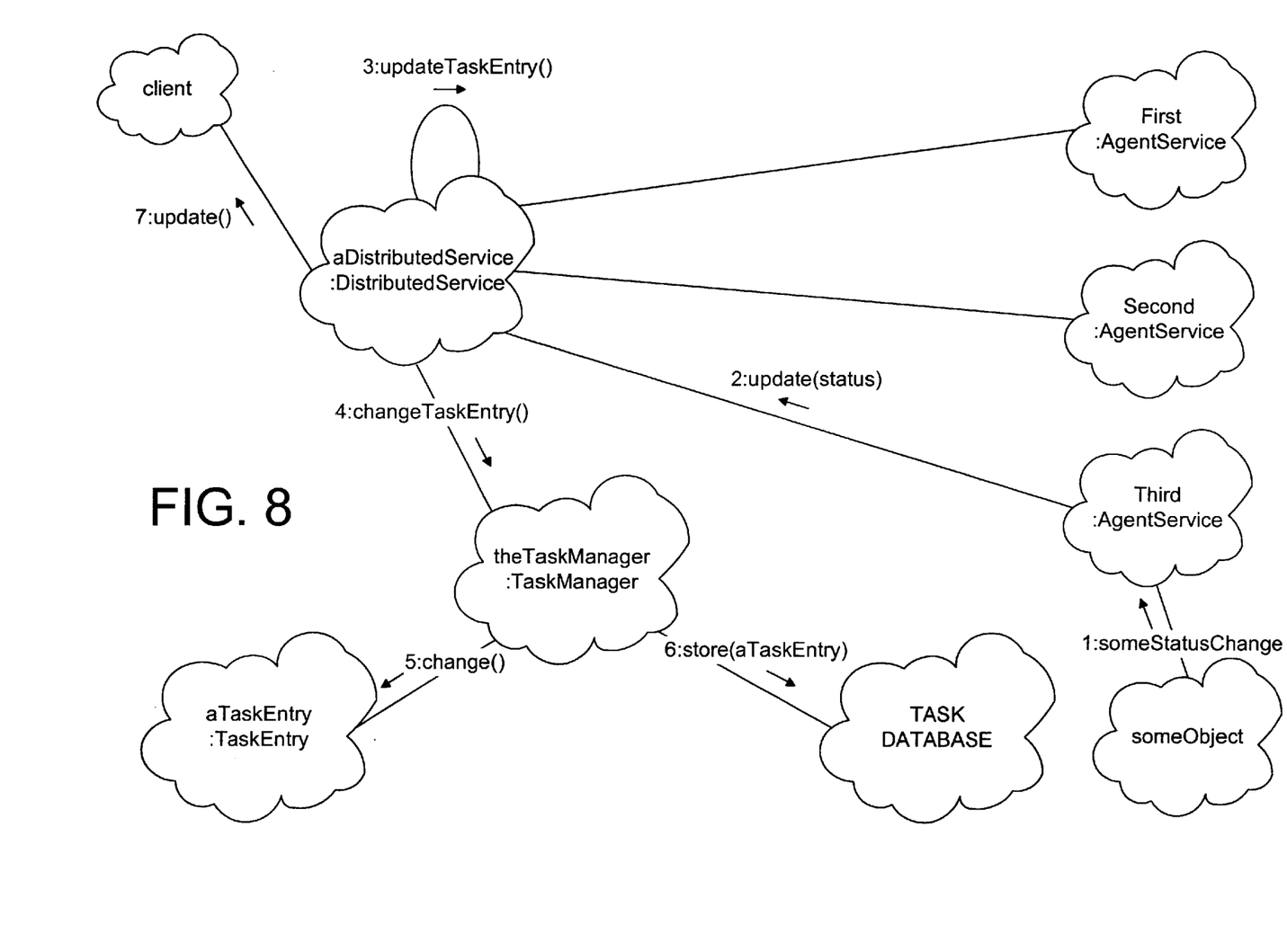
FIG. 8 is an object diagram that includes the steps in accordance with the preferred embodiments to provide status updates as a task in a network application is performed.

Referring now to FIG. 8, the steps are shown for providing status updates as a task is executing. We assume for the purpose of illustration that the steps in FIG. 5 have all been performed, and that the agent services are all running. Next, we assume that an object someObject reflects some status change to the Third:AgentService object (step 1). In response, the Third:AgentService object invokes the update( ) method on the DistributedService object, passing the status as a parameter. The DistributedService object then invokes its own updateTaskEntry( ) method (step 3), which causes the changeTaskEntry( ) method on the TaskManager to be invoked (step 4). In response, the TaskManager object invokes the change( ) method on the TaskEntry object (step 5), and invokes the store( ) method to store the changed TaskEntry object in the task database (step 6). At this point the status has been rippled through to the TaskEntry object and to the persistent representation of the TaskEntry object stored in the task database. Note that the transient TaskEntry instance may be updated in step 5 without necessarily updating the task database in step 6, so that frequent status changes do not all have to be saved to the task database. If desired, an update( ) method may also be invoked on the client (step 7) to provide a user with a visual indication of the progress of the task. Framework 124 thus provides integral support for reporting status of tasks. By creating a network application by appropriate subclassing of the DistributedService and AgentService classes, operations in the network application may report status using the methods defined in framework 124 without explicitly generating any code to support status reporting.

The present invention thus provides a consistent approach for generating network applications. By providing predefined classes in the operation manager framework, and burying the core functions of the framework so these functions are performed "under the covers" (i.e., these functions are performed by the framework without requiring the user to define these functions) the framework allows a programmer to generate a network application by only defining two subclasses, a concrete DistributedService subclass and a concrete AgentService subclass. Any task in a newly-defined network application will automatically be able to use the status reporting, recovery, scheduling, reexecution, persistence, and sharing functions defined in the core function of the framework 124. Thus, heterogeneous tasks may all have similar functions defined by the framework. The result is network applications and tasks that are uniform and that all support basic functions that most tasks in network applications require.

The task of distributing software updates was specifically addressed as an example with reference to FIG. 5 that is supported by framework mechanism 124. However, the present invention extends to any type of operation, task or service that can be performed using multiple computer systems. For example, framework mechanism 124 may be used by a distributed database to replicate its data in many different locations. In a retail setting, framework mechanism 124 may be used to communicate changed inventory information to multiple computer systems. For example, a central computer may receive information that a sale at one store has reduced its available inventory, and this information can then be updated on the systems for the other stores to reflect the change in inventory. Another task that could be run using framework mechanism 124 is a performance analysis tool that could analyze a group of computer systems to determine which systems are running under the heaviest load, which systems have the heaviest network traffic, etc. In sum, framework mechanism 124 can be extended to perform any type of task that can be performed on multiple computer systems on a computer network, and all such tasks are within the scope of the present invention.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims.

We claim:

1. An apparatus comprising:
    at least one processor;
    a memory coupled to the at least one processor; and
    an object oriented operation manager framework mechanism residing in the memory and executed by the at least one processor, the operation manager framework mechanism including:
        at least one operation manager mechanism that is a core function of the framework mechanism that cannot be modified by a user; and
        at least one extensible class that a user may extend to define a network application, the network application including the at least one operation manager mechanism, the at least one extensible class including a distributed service class comprising:
            at least one distributed service object; and
            a first set of object methods to convert the distributed service object into a task that may be managed by the framework mechanism.

2. The apparatus of claim 1 wherein the framework mechanism defines a task manager class comprising:
    at least one task manager object; and
    a second set of object methods that maintain a list of task entries in the task manager object and that run the tasks corresponding to the task entries.

3. The apparatus of claim 2 wherein the framework mechanism further defines a task entry class that is a wrapper class for the distributed service class, the task entry class comprising:

at least one task entry object, each task entry object corresponding to a task entry in the list of task entries in the task manager object; and a third set of object methods that perform task-specific functions relating to a distributed service object contained in each task entry object.

4. The apparatus of claim 3, wherein the framework mechanism further comprises a task database that stores a persistent version of the task entry object.

5. The apparatus of claim 1 wherein the framework mechanism defines an agent service class comprising:

at least one agent service object that runs on an end point computer system.

6. The apparatus of claim 1 wherein the framework mechanism defines a system group class comprising:

at least one system group object that contains a list of end point computer systems that may be used to execute the network application.

7. The apparatus of claim 1 wherein the framework mechanism comprises a status reporting mechanism that reports the status of the execution of the network application.

8. The apparatus of claim 1 wherein the framework mechanism comprises a recovery mechanism that monitors the status of a network application and that recovers from a system failure by performing any operation in the network application that needs to be performed according to the monitored status when the system failure occurs.

9. The apparatus of claim 1 wherein the framework mechanism comprises a scheduling mechanism that supports the scheduling of at least one operation in the network application for execution at a later time.

10. The apparatus of claim 1 wherein the framework mechanism comprises a reexecution mechanism that executes a previously-defined operation of the network application.

11. The apparatus of claim 1 wherein the framework mechanism comprises a persistence mechanism that stores persistent copies of operations in the network application in a persistent store.

12. The apparatus of claim 1 wherein the framework mechanism comprises a sharing mechanism that shares the ability to view and change the execution of operations in the network application between users.

13. An apparatus comprising:

(1) at least one processor;

(2) a memory coupled to the at least one processor; and (3) an object oriented operation manager framework mechanism residing in the memory and executed by the at least one processor, the operation manager framework mechanism including:

(3A1) a task manager class comprising:
at least one task manager object; and
a first set of object methods that maintain a list of task entries in the task manager object and that run the tasks corresponding to the task entries;

(3A2) a task entry class that is a wrapper class for a distributed service class, the task entry class comprising:
at least one task entry object, each task entry object corresponding to a task entry in the list of task entries in the task manager object; and
a second set of object methods that perform task-specific functions relating to a distributed service object contained in each task entry object;

(3A3) a task database that stores a persistent version of the task entry object;

(3A4) a status reporting mechanism that reports the status of the execution of a network application that includes the framework mechanism;

(3A5) a recovery mechanism that monitors the status of a network application and that recovers from a system failure by performing any operation in the network application that needs to be performed according to the monitored status when the system failure occurs;

(3A6) a scheduling mechanism that supports the scheduling of at least one operation in the network application for execution at a later time;

(3A7) a reexecution mechanism that executes a previously-defined operation of the network application;

(3A8) a persistence mechanism that stores persistent copies of operations in the network application in the task database;

(3A9) a sharing mechanism that shares the ability to view and change the execution of operations in the network application between users;

(3A10) the distributed service class comprising:
at least one distributed service object; and
a third set of object methods to convert the distributed service object into a task that may be managed by the at least one operation manager mechanism;

(3A11) an agent service class comprising:
at least one agent service object that runs on an end point computer system;

(3A12) a system group class comprising:
at least one system group object that contains a list of end point computer systems that may be used to execute the network application.

14. A method for generating a network application that includes operations that may be executed on a plurality of computer systems, the method comprising the steps of:

(1) a user extending an object oriented operation manager framework mechanism to define the network application, the framework mechanism comprising:

(A) at least one operation manager mechanism that is a core function of the framework mechanism that cannot be modified by a user; and (B) at least one extensible class that a user may extend to define the network application, the network application including the at least one operation manager mechanism, the at least one extensible class including a distributed service class comprising:

(B1) at least one distributed service object; and
(B2) a first set of object methods to convert the distributed service object into a task that may be managed by the framework mechanism;

(2) executing the network application on the plurality of computer systems.

15. A method for managing operations of a network application that may be executed on a plurality of computer systems, the method comprising the steps of:

(1) a user extending an object oriented operation manager framework mechanism to define the network application, the framework mechanism comprising:

(A) at least one operation manager mechanism that is a core function of the framework mechanism that cannot be modified by a user; and (B) at least one extensible class that a user may extend to define the network application, the network application including the at least one operation manager mechanism, the at least one extensible class including a distributed service class comprising:
at least one distributed service object; and
a first set of object methods to convert the distributed service object into a task that may be managed by the framework mechanism;

(2) executing the network application on the plurality of computer systems;

(3) reporting the status of executing the operations in the network application using the at least one operation manager mechanism.

16. The method of claim 15 further comprising the step of creating persistent copies of the operations in a persistent store.

17. The method of claim 15 further comprising the step of sharing the ability to view and change the execution of the operations with a different user.

18. The method of claim 15 further comprising the step of scheduling the execution of the operations in the network application.

19. The method of claim 15 further comprising the steps of:
monitoring the status of a network application; and
recovering from a system failure by performing any operation in the network application that needs to be performed according to the monitored status when the system failure occurs.

20. The method of claim 15 further comprising the step of reexecuting a previously-defined operation of the network application.

21. A method for managing operations of a network application that may be executed on a plurality of computer systems, the method comprising the steps of:
(1) a user extending an object oriented operation manager framework mechanism to define the network application, the framework mechanism comprising:
(A) at least one operation manager mechanism that is a core function of the framework mechanism that cannot be modified by a user; and
(B) at least one extensible class that a user may extend to define the network application, the network application including the at least one operation manager mechanism;
(2) executing the network application on the plurality of computer systems;
(3) reporting the status of executing the operations in the network application using the at least one operation manager mechanism;
(4) creating persistent copies of the operations in a persistent store;
(5) sharing the ability to view and change the execution of the operations with a different user;
(6) scheduling the execution of the operations in the network application;
(7) monitoring the status of a network application;
(8) recovering from a system failure by performing any operation in the network application that needs to be performed according to the monitored status when the system failure occurs; and
(9) reexecuting a previously-defined operation of the network application.

22. A program product comprising:
(A) an object oriented operation manager framework mechanism residing in the memory and executed by the at least one processor, the operation manager framework mechanism including:
at least one operation manager mechanism that is a core function of the framework mechanism that cannot be modified by a user; and
at least one extensible class that a user may extend to define a network application, the network application including the at least one operation manager mechanism, the at least one extensible class including a distributed service class comprising:
at least one distributed service object; and
a first set of object methods to convert the distributed service object into a task that may be managed by the framework mechanism; and
(B) signal bearing media bearing the operation manager framework mechanism.

23. The program product of claim 22 wherein the signal bearing media comprises recordable media.

24. The program product of claim 22 herein the signal bearing media comprises transmission media.

25. The program product of claim 23 wherein the framework mechanism defines a task manager class comprising:
at least one task manager object; and
a second set of object methods that maintain a list of task entries in the task manager object and that run the tasks corresponding to the task entries.

26. The program product of claim 25 wherein the framework mechanism further defines a task entry class that is a wrapper class for the distributed service class, the task entry class comprising:
at least one task entry object, each task entry object corresponding to a task entry in the list of task entries in the task manager object; and
a third set of object methods that perform task-specific functions relating to a distributed service object contained in each task entry object.

27. The program product of claim 26 wherein the framework mechanism further comprises a task database that stores a persistent version of the task entry object.

28. The program product of claim 22 herein the framework mechanism defines an agent service class comprising:
at least one agent service object that runs on an end point computer system.

29. The program product of claim 22 wherein the framework mechanism defines a system group class comprising:
at least one system group object that contains a list of end point computer systems that may be used to execute the network application.

30. The program product of claim 22 wherein the framework mechanism comprises a status reporting mechanism that reports the status of the execution of the network application.

31. The program product of claim 22 wherein the framework mechanism comprises a recovery mechanism that monitors the status of a network application and that recovers from a system failure by performing any operation in the network application that needs to be performed according to the monitored status when the system failure occurs.

32. The program product of claim 22 wherein the framework mechanism comprises a scheduling mechanism that supports the scheduling of at least one operation in the network application for execution at a later time.

33. The program product of claim 22 herein the framework mechanism comprises a reexecution mechanism that executes a previously-defined operation of the network application.

34. The program product of claim 22 wherein the framework mechanism comprises a persistence mechanism that stores persistent copies of operations in the network application in a persistent store.

35. The program product of claim 22 wherein the framework mechanism comprises a sharing mechanism that shares the ability to view and change the execution of operations in the network application between users.

36. A program product comprising:
(1) an object oriented operation manager framework mechanism residing in the memory and executed by the at least one processor, the operation manager framework mechanism including:
   (1A1) a task manager class comprising:
      at least one task manager object; and
      a first set of object methods that maintain a list of task entries in the task manager object and that run the tasks corresponding to the task entries;
   (1A2) a task entry class that is a wrapper class for a distributed service class, the task entry class comprising:
      at least one task entry object, each task entry object corresponding to a task entry in the list of task entries in the task manager object; and
      a second set of object methods that perform task-specific functions relating to a distributed service object contained in each task entry object;
   (1A3) a task database that stores a persistent version of the task entry object;
   (1A4) a status reporting mechanism that reports the status of the execution of a network application that includes the framework mechanism;
   (1A5) a recovery mechanism that monitors the status of a network application and that recovers from a system failure by performing any operation in the network application that needs to be performed according to the monitored status when the system failure occurs;
   (1A6) a scheduling mechanism that supports the scheduling of at least one operation in the network application for execution at a later time;
   (1A7) a reexecution mechanism that executes a previously-defined operation of the network application;
   (1A8) a persistence mechanism that stores persistent copies of operations in the network application in the task database;
   (1A9) a sharing mechanism that shares the ability to view and change the execution of operations in the network application between users;
   (1A10) the distributed service class comprising:
      at least one distributed service object; and
      a third set of object methods to convert the distributed service object into a task that may be managed by the at least one operation manager mechanism;
   (1A11) an agent service class comprising:
      at least one agent service object that runs on an end point computer system;
   (1A12) a system group class comprising:
      at least one system group object that contains a list of endpoint computer systems that may be used to execute the network application; and
(2) computer-readable signal bearing media bearing the operation manager framework mechanism.

\* \* \* \* \*